United States Patent Office 2,702,289
Patented Feb. 15, 1955

2,702,289

UREA ADDUCTS OF STRAIGHT-CHAIN 1-HALOALKANES

Norman J. Bowman, Gary, Ind., and Robert A. Dinerstein, Chicago, Ill., assignors to Standard Oil Company, Chicago, Ill., a corporation of Indiana No Drawing. Application December 27, 1947, Serial No. 794,200

17 Claims. (Cl. 260—96.5)

This invention relates to the separation of straight-chain 1-haloalkanes from mixtures of organic compounds. More particularly, it relates to a simple and convenient method for the separation of straight-chain 1-haloalkanes from mixtures of organic compounds by selective reaction with urea. In an especially advantageous embodiment, our invention relates to the separation of straight-chain 1-haloalkanes from mixtures containing isomeric haloalkanes by selective reaction with urea.

In the preparation of haloalkanes by various means, such as by the reaction of hydrogen halides with olefins, mixtures of the various theoretically possible isomers are generally obtained, and highly complex mixtures are ordinarily produced when the preparation is effected by the halogenation of hydrocarbons. The resulting products are commonly quite difficult to separate owing to their complexity and to the similarity of their constituents in physical and chemical properties. Fractional distillation, for example, is inadequate for effecting a clean separation, owing to the small differences among the boiling points of the materials. We have now discovered that straight-chain 1-haloalkanes having six or more carbon atoms in the molecule react with urea to form solid adducts, whereas the isomeric haloalkanes, other than fluoroalkanes, do not; and on the basis of this discovery, we have developed a method for effecting a substantially complete segregation of straight-chain 1-haloalkanes containing six or more carbon atoms in the molecule from mixtures with urea-unreactive organic compounds, including the isomeric haloalkanes other than straight-chain 1-fluoroalkanes having six or more carbon atoms in the molecule and/or branched-chain, alicyclic, and/or aromatic organic compounds in general. Our invention constitutes a highly advantageous technique for the segregation and preparation of straight-chain 1-chloroalkanes, 1-bromoalkanes, and 1-iodoalkanes in substantially pure form, in particular from the crude mixtures obtained in their preparation, which contain isomeric straight-chain haloalkanes.

One object of our invention is to effect the separation of straight-chain 1-haloalkanes having six or more carbon atoms in the molecule from mixtures thereof with urea-unreactive organic compounds. Another object of our invention is to effect the separation of said 1-haloalkanes other than fluoroalkanes from mixtures thereof with isomeric haloalkanes of the same group. A further object of our invention is to effect the separation of said 1-haloalkanes other than fluoroalkanes from mixtures thereof with the isomeric haloalkanes. A still further object of our invention is to effect the separation of said 1-haloalkanes other than fluoroalkanes from the mixtures formed in their preparation by the halogenation of aliphatic hydrocarbons and by the hydrohalogenation of 1-alkenes. A special object of our invention is to separate olefins from other organic compounds and from each other by subjecting them to hydrohalogenation, urea treatment, and dehydrohalogenation. Other objects of our invention and its advantages over the prior art will be apparent from the following description and examples.

In carrying out the process of our invention, we slurry urea and an activator with a charging stock containing a straight-chain 1-haloalkane containing six or more carbon atoms in the molecule, and agitate the mixture until the formation of urea-1-haloalkane adduct is completed. The resulting slurry is then filtered, centrifuged, or separated by decantation, the solids are optionally washed with a suitable liquid to remove the mother liquor therefrom, and the urea complex is decomposed by heating to an elevated temperature, suitably as high as the melting point of urea or above, or by adding a urea solvent such as water, a lower aliphatic alcohol, or the like, to regenerate the 1-haloalkane, which is then separated. Suitable urea activators may be chosen from the class including water and various oxygenated organic compounds, such as alcohols, aldehydes, and ketones. Among the organic activators, we have found aliphatic monohydric alcohols, aliphatic aldehydes, and aliphatic ketones to be most effective, and our preferred activators are water, methanol, acetone, ethanol, n-propyl alcohol, and isopropyl alcohol. Where the oxygenated organic activators are straight-chain compounds, they should preferably, but not necessarily, be chosen from the group containing less than six carbon atoms in the molecule, since the latter group are more effective, and do not tend to undergo competitive reactions with urea. The urea may be used as a saturated solution in such activators, or as a slurry of urea in such a saturated solution. Preferably, however, we use a mixture of activator and urea having a molar ratio between about 0.05:1 and 1:1.

To effect the complete segregation of straight-chain 1-haloalkanes from mixtures comprised thereof, we have found that the molar ratio of urea to straight-chain 1-haloalkane should be at least about $(n-2):1$ where $n$ is the number of carbon atoms in the straight-chain 1-haloalkane, and we ordinarily prefer to use somewhat in excess of this ratio in order to accelerate the rate of reaction and to drive the reaction to completion.

It will be apparent that the charging stock may contain other urea-reactive materials, such as straight-chain saturated hydrocarbons, straight-chain olefins, straight-chain alcohols, and the like. In such case, it is not feasible to separate straight-chain 1-haloalkanes selectively by a simple urea treatment. Instead, a sufficient quantity of urea should be used to react with substantially all of the urea-reactive materials, the required molar ratio being at least around $(n-2):1$, where $n$ is the overall average number of carbon atoms per molecule in the total quantity of urea-reactive constituents of the charging stock; and after separation of the urea-reactive group of materials, the straight-chain 1-haloalkanes, being now free from any other type of haloalkanes, may be segregated from the undesired materials by conventional procedures, such as fractional distillation, fractional crystallization, and the like.

The reaction between urea and straight-chain 1-haloalkanes takes place best at temperatures between about 20 and 65° C., but may be carried out at substantially lower and higher temperatures, suitably between around 0 and 90° C., as long as a liquid phase and a solid phase are maintained within the reaction vessel. The reactants may be mixed at an elevated temperature (for example, around 100° C. or above) and cooled to the desired reaction temperature. In an advantageous embodiment of our invention, the reactants may be mixed at a temperature above the melting point of urea, and then cooled while being vigorously agitated. Excellent contact is thereby assured, and the urea adduct is formed as the temperature of the mixture falls below the level at which a solid phase forms.

The reaction time in our process is not critical. The reaction mixture is preferably agitated for a period of at least 0.1 hour, and the reaction is complete in most cases in from one-half to one hour. Substantially shorter reaction times may be used, since we have observed that the initial stages of adduct formation take place very rapidly; and substantially longer reaction times may of course be used if desired, especially when processing long-chain materials, which tend to react somewhat more slowly.

Elevated pressures may be maintained within the reaction vessel, if desired, particularly if the reaction mixture contains volatile constituents.

In effecting the contact of the urea with the charging stock, the charging stock may be diluted with a non-reactive liquid, if desired, suitably a branched-chain hydrocarbon, such as isooctane, an aromatic hydrocarbon, such as benzene, or an alicyclic hydrocarbon, such as cyclohexane. The diluent should have substantially no reactivity with or solvency for urea. The use of such diluents is particularly desirable where the charging stock has a high melting point or a high viscosity, or where it contains a major proportion of urea-reactive materials. Similar diluent liquids may be used in washing the urea-1-haloalkane adduct to remove occluded liquids after the adduct has been removed from the reaction mixture. Where charging stocks are being processed that are solid at ordinary temperatures, the washing may be done at an elevated temperature.

Decomposition of the urea-1-haloalkane adduct is effected by heating, or by adding a urea solvent, such as one of the activators set forth above, and agitating at a temperature above the melting point of the straight-chain 1-haloalkane. Two phases are formed thereby, one of them comprising a solution of urea, and the other comprising the liberated straight-chain 1-haloalkane. The latter may be either the upper or lower phase, depending on the relative densities of the phases. The urea solution is separated and recycled, being first concentrated, if desired, or processed to recover solid urea. The 1-haloalkane layer is withdrawn, and may be subjected to further processing, such as washing with water to remove entrained or dissolved urea and/or activator, followed by distillation, if desired.

Alternatively, a tower may be employed for the reaction of urea with the charging stock, similar to towers employed in the prior art for silica-gel adsorption. The urea, moistened with a suitable activator, is mixed with a spacer such as ground cork and is placed in the tower. The charging stock, diluted if desired with a non-reactive liquid, is passed slowly through the urea bed until the effluent liquid begins to show a substantial quantity of straight-chain 1-haloalkane. The flow of charging stock is then stopped, and the tower is washed with a non-reactive liquid. Thereafter, the adduct is decomposed with a urea solvent, and the liberated 1-haloalkane is recovered.

Our invention will be more fully understood from the following specific examples:

Example I

Carbon monoxide was hydrogenated in the presence of a fluidized, alkali-promoted iron catalyst, and a product containing a highly olefinic hydrocarbon phase and an aqueous phase was obtained. The hydrocarbon phase was fractionally distilled, and from it was thereby separated a $C_{10}$ hydrocarbon fraction containing approximately 75 percent of monoolefins. The $C_{10}$ fraction was commingled with anhydrous hydrogen bromide, and benzoyl peroxide was added to the reaction mixture in the proportion of 8 percent by weight to encourage anti-Markownikoff addition of the hydrogen bromide to the 1-alkenes present in the mixture. After the reaction had reached completion, unreacted hydrocarbons were removed by fractionation, leaving a mixture of alkyl bromides.

A portion of the mixed alkyl bromides, obtained as described above, weighing 110 grams was added to a slurry of 360 grams of urea and 350 milliliters of methanol, and the resulting mixture was stirred for 10 minutes. A thick slurry resulted, and was subsequently vacuum-filtered and sucked as dry as possible. The solid was then reslurried with 350 milliliters of benzene, stirred for ten minutes, and filtered again. The solid adduct obtained thereby was decomposed with two liters of water, and the resulting alkyl bromide layer was separated. The alkyl bromide layer proved to be practically pure 1-bromodecane, in a yield of 25 percent, based on the weight of alkyl bromides in the charging stock to the urea-treatment step.

The unreacted alkyl bromides that were recovered in the first filtration step, above, were treated again with urea and methanol, and no further reaction was observed.

Example II

Anhydrous hydrogen bromide was reacted with a mixture of $C_{10}$ straight-chain hydrocarbons containing 85 percent olefins in the presence of benzoyl peroxide, as described in Example I. From the resulting product, a mixture of all the isomeric straight-chain alkyl bromides was segregated by fractionation. It was found that this mixture could not be further segregated by fractionation. Treatment of the alkyl bromide mixture with urea as in Example I gave a yield of 48 percent of 1-bromodecane. The bromodecane raffinate, on being further treated with urea, failed to react.

Example III

A saturated solution of urea in methanol was added to a $C_8$-to-$C_{10}$ fraction of brominated aliphatic hydrocarbons, and during an agitation period of approximately 45 minutes at room temperature a voluminous solid adduct was formed. The adduct was separated by filtration and decomposed with an excess of water. The liberated oil layer, after being separated and dried, was fractionally distilled and found to consist of straight-chain 1-bromoalkanes in the $C_6$-to-$C_{10}$ range.

Example IV

A number of pure alkyl halides were contacted with urea by essentially the procedure given in Example I. Solid adducts were formed by the following:

1-chlorododecane
1-bromohexane
1-bromodecane
1-bromohexadecane
1-iodoctane

The following failed to form an adduct:

2-chlorooctane
Branched-chain mixed $C_8$-$C_{10}$ alkyl chlorides
2-bromooctane
1-bromo-2-methylheptane While our invention has been described in the above examples in application to certain specific charging stocks, and to certain operating techniques, it is to be understood that we do not wish to be limited thereby. Our invention is broadly applicable to the separation and purification of straight-chain 1-haloalkanes, as herein described and defined, and it is to be understood that any modifications or equivalents that would ordinarily occur to those skilled in the art are to be considered as lying within the scope of our invention.

The expression "urea-unreactive" used herein to define a class of organic compounds denotes that such compounds do not form solid adducts when contacted with urea under the conditions described in the prior art. Under this definition, branched-chain, alicyclic, and aromatic hydrocarbons, and alcohols, aldehydes, and ketones derived therefrom, are "urea-unreactive" classes of organic compounds. We have now found that chloroalkanes, bromoalkanes, and iodoalkanes, other than the straight-chain 1-halo isomers, are also urea-unreactive.

In accordance with the foregoing specification, we claim as our invention:

1. A complex of urea with a straight-chain 1-haloalkane having at least six carbon atoms in the molecule.
2. A complex of urea with a straight-chain 1-bromoalkane having at least six carbon atoms in the molecule.
3. A complex of urea with a straight-chain 1-chloroalkane having at least six carbon atoms in the molecule.
4. The complex of urea and hexadecyl bromide.
5. A complex of urea and 1-bromo-n-hexadecane.
6. A process which comprises contacting urea with a straight-chain 1-haloalkane having at least six carbon atoms in the molecule, and separating from the resulting reaction mixture a solid adduct of urea and said straight-chain 1-haloalkane.
7. The process which comprises contacting urea and a urea solvent with a straight-chain 1-haloalkane containing at least six carbon atoms in the molecule, and separating from the resulting reaction mixture a solid adduct of urea and said straight-chain 1-haloalkane.
8. The process which comprises contacting urea and a urea solvent with a mixture of organic compounds comprising a straight-chain 1-haloalkane containing at least six carbon atoms in the molecule, and separating from the resulting reaction mixture a solid adduct of urea and said straight-chain 1-haloalkane.
9. In a process for separating a straight-chain 1-haloalkane containing at least six carbon atoms in the molecule from a mixture comprised thereof with a urea-unreactive organic compound, the steps which comprise contacting said mixture with urea and a urea solvent, separating a solid adduct of said straight-chain 1-haloalkane and urea, liberating said 1-haloalkane from said adduct, and separating and withdrawing said 1-haloalkane, substantially free from said urea-unreactive organic compound.

10. The process of claim 9 wherein said straight-chain 1-haloalkane is a straight-chain 1-bromoalkane.

11. The process of claim 9 wherein said straight-chain 1-haloalkane is a straight-chain 1-chloroalkane.

12. A process for separating a straight-chain 1-haloalkane containing at least six carbon atoms in the molecule from a mixture comprised thereof with a urea-unreactive organic compound which comprises diluting said mixture with an organic liquid having substantially no reactivity with or solvency for urea, contacting the diluted mixture with urea and a urea solvent, separating a solid adduct of said straight-chain 1-haloalkane and urea, liberating said 1-haloalkane from said adduct, and separating and withdrawing said 1-haloalkane, substantially free from said urea-unreactive organic compound.

13. A process for separating a straight-chain 1-haloalkane containing at least six carbon atoms in the molecule from a mixture comprised thereof with a urea-unreactive organic compound which comprises contacting said mixture with urea and a urea solvent, separating a solid adduct of said straight-chain 1-haloalkane and urea, commingling said adduct with a urea solvent at a temperature above the melting point of said 1-haloalkane, whereby said 1-haloalkane is liberated, and separating and withdrawing said 1-haloalkane, substantially free from said urea-unreactive organic compound.

14. In a process for separating a straight-chain 1-haloalkane selected from the group consisting of straight-chain 1-chloroalkanes, 1-bromoalkanes, and 1-iodoalkanes, and containing at least six carbon atoms in the molecule, from a mixture comprised thereof with a haloalkane isomeric with said 1-haloalkane, the steps which comprise contacting said mixture with urea and a urea solvent, separating a solid adduct of said straight-chain 1-haloalkane and urea, liberating said 1-haloalkane from said adduct, and separating and withdrawing said 1-haloalkane, substantially free from said isomeric haloalkane.

15. In a process for separating a straight-chain 1-haloalkane selected from the group consisting of straight-chain 1-chloroalkanes, 1-bromoalkanes, and 1-iodoalkanes, and containing at least six carbon atoms in the molecule, from a mixture comprised thereof with a straight-chain haloalkane isomeric with said straight-chain 1-haloalkane, the steps which comprise contacting said mixture with urea and a urea solvent, separating a solid adduct of said straight-chain 1-haloalkane and urea, liberating said 1-haloalkane from said adduct, and separating and withdrawing said 1-haloalkane, substantially free from said isomeric straight-chain 1-haloalkane.

16. In a process for separating a straight-chain 1-haloalkane selected from the group consisting of straight-chain 1-chloroalkanes, 1-bromoalkanes, and 1-iodoalkanes, and containing at least six carbon atoms in the molecule, from a mixture of isomeric straight-chain halogenated hydrocarbons other than fluorinated hydrocarbons containing said 1-haloalkane, the steps which comprise contacting said mixture with urea and a urea solvent, separating a solid adduct of said 1-haloalkane and urea, washing said adduct with an organic liquid having substantially no solvency for or reactivity with urea, commingling said adduct with a urea solvent at a temperature above the melting point of said 1-haloalkane, whereby said 1-haloalkane is liberated, and separating and withdrawing said 1-haloalkane, substantially free from other halogenated hydrocarbons.

17. A process for the fractionation of a mixture of halogenated hydrocarbons having from 6 to 16 carbon atoms, said mixture consisting essentially of a fraction A consisting of straight chain 1-haloalkanes wherein the halogen atom is selected from the group consisting of chlorine, bromine and iodine and a fraction B consisting of straight chain haloalkanes isomeric with those in fraction A, comprising treating said mixture with urea and a urea solvent at a temperature of 0° to 75° C. for a time sufficient to form crystalline molecular complexes between urea and a major proportion of fraction A but insufficient to form complexes with more than a minor proportion of fraction B and separating the crystalline complexes so formed from the unaffected halogenated hydrocarbons.

References Cited in the file of this patent

UNITED STATES PATENTS

| Number | Name | Date |
|---|---|---|
| 1,830,859 | Schotte et al. | Nov. 10, 1931 |
| 2,300,134 | Priewe | Oct. 27, 1942 |
| 2,376,008 | Riethof | May 15, 1945 |
| 2,520,715 | Fetterly | Aug. 29, 1950 |
| 2,520,716 | Fetterly | Aug. 29, 1950 |

OTHER REFERENCES

Bengen, "Technical Oil Mission, Reel 143," pages 2–6 (May 22, 1946).